INVENTOR
A. M. NOLL
BY Jules P. Kirsch
ATTORNEY

SPURIOUS PEAK IN $C_{j-1}$ SPECTRUM

PITCH DOUBLING AT $C_{j-1}$ SPECTRUM 3,420,955
AUTOMATIC PEAK SELECTOR

A. Michael Noll, Newark, N.J., assignor to Bell Telephone Laboratories, Incorporated, New York, N.Y., a corporation of New York Filed Nov. 19, 1965, Ser. No. 508,726
U.S. Cl. 179—1 7 Claims
Int. Cl. H04m *1/00*

This invention relates to the transmission of human speech in coded form, and in particular to systems for transmitting human speech in coded form in order to conserve transmission channel bandwidth. This invention also relates to the analysis of complex waves in order to determine the periodicity and aperiodicity of such waves.

Conventional speech communication systems, for example, commercial telephone systems, typically convey human speech by transmitting an electrical facsimile of the acoustic waveform produced by a human talker. Because of the redundancy of human speech, however, facsimile transmission is a relatively inefficient way to transmit speech information, and it is well known that the information contained in a typical speech sound may be transmitted over a channel of substantially narrower bandwidth than that required for facsimile transmission of the speech waveform.

A number of arrangements for compressing or otherwise reducing the amount of bandwidth employed in the transmission of speech information have been proposed, and several of these arrangements have been described in an article by E. E. David, Jr. entitled "Signal Theory in Speech Transmission," vol. CT3, IRE Transactions on Circuit Theory, p. 232 (1956). In these arrangements, a speech wave is analyzed to determine its significant characteristics, and coded information regarding these characteristics is transmitted instead of the speech wave itself to a distant receiver station where a synthetic speech wave is reproduced from the coded information. Since the coded information requires a relatively small amount of transmission bandwidth, these bandwidth compression arrangements effect a substantial reduction in the amount of bandwidth required to transmit the information content of human speech.

In general, different groups of speech characteristics are represented in coded form in different bandwidth compression systems, but there is one speech characteristic that is common to a number of different bandwidth compression systems. This characteristic is the so-called pitch characteristic, and it describes the nature of the excitation that is applied to a talker's vocal tract to produce different speech sounds. Specifically, the pitch characteristic is descriptive of the fact that the voiced sounds of human speech are produced by exciting the resonances of the vocal tract with quasi-periodic puffs of air released from the lungs into the vocal tract by the glottis or vocal cords, whereas the unvoiced sounds of human speech are produced by the passage of turbulent air through constrictions in the vocal tract. In a typical bandwidth compression system, therefore, coded information regarding the pitch characteristic indicates whether a speech sound at a given instant is voiced or unvoiced, and if the sound is voiced, the periodicity of the sound.

A number of proposals have been made for automatically detecting or measuring the pitch characteristic, examples of which are described on pp. 236–238 of the above-mentioned David article. In these proposals, detection of the pitch characteristic is founded upon various observed properties of the speech waveform or its spectrum. For example, voice sounds are characterized by a periodic speech waveform whereas unvoiced sounds are characterized by an aperiodic speech waveform, and this periodic-aperiodic distinction between voiced and unvoiced sounds is manifested in the speech spectrum by the presence or absence of harmonically related frequency components. In practice, however, automatic detection of the pitch characteristic has not been sufficiently accurate, as evidenced by the unnatural quality of the synthetic speech produced in systems in which the pitch characteristic is one of the coded speech characteristics. Although arrangements such as the voice-excited vocoder described in M. R. Schroeder Patent 3,030,450, issued Apr. 17, 1962, avoid this problem by transmitting pitch information in the form of a relatively wide portion or baseband of the original speech wave, this solution requires a greater amount of bandwidth to transmit excitation information than a coded representation of the pitch characteristic.

An investigation of the sources of difficulty in accurately determining the pitch characteristic has revealed that one of the principal sources of error is the influence of the characteristics of the vocal tract upon the speech waveform. In particular, it has been determined that the resonances or formats of the human vocal tract produce irregularities in the characteristics of the speech waveform and its spectrum which prevent accurate determination of the pitch characteristic directly from the speech waveform or its spectrum.

A number of proposals have been made for determining the pitch characteristic by suppressing or otherwise removing the influence of the resonances or formats of the vocal tract from the speech waveform prior to measurement and encoding of the pitch characteristic; several of these proposals are included in copending patent applications of M. M. Sondhi, Ser. No. 460,100, filed June 1, 1965; E. E. David, Jr., et al., Ser. No. 460,101, filed June 1, 1965; A. M. Noll et al., Ser. No. 420,362, filed Dec. 22, 1964; and M. R. Schroeder, Ser. No. 300,264, filed Aug. 6, 1963.

In the copending application of A. M. Noll et al. cited above, the influence of the vocal tract formants is removed by performing two successive spectral analysis upon a speech wave, the first analysis being performed upon each of a succession of segments of the speech wave to obtain a corresponding succession of first short-time spectra, while the second analysis is performed upon each of a succession of waveforms representing the logarithm of each of the first short-time spectra to obtain a corresponding succession of second short-time spectra. Each of the second short-time spectra obtained in this manner is also referred to as a "cepstrum," which, as described by A. M. Noll in "Short-Time Spectrum and 'Cepstral' Techniques for Vocal Pitch Detection," vol. 36, Journal of the Acoustical Society of America, p. 296 (1964) is simply an abbreviation for the phrases "short-time spectrum of the logarithm of a short-time spectrum." Periodicity in any one of the original speech wave segments causes a periodic, fine wave structure to be imposed on a coarse wave structure in the corresponding first short-time spectrum, and the second short-time spectrum derived from the logarithm of such a first short-time spectrum is characterized by a single large peak, also referred to as a voiced peak, whose location on the time scale indicates the time length of the periods in the original speech wave segment. Correspondingly, aperiodicity in the original speech wave segment is characterized by an absence of a periodic, fine wave structure in the first short-time spectrum, and the corresponding second short-time spectrum is characterized by the absence of a single large peak in the range of the fundamental period.

In the present invention, the characteristics of the succession of second short-time spectra derived from a speech wave are turned to advantage to detect the occurrence of voiced and unvoiced sound intervals in the original speech wave. In general, voiced and unvoiced intervals are respectively detected by examining each second short-time spectrum for the presence or absence of a single large peak exceeding a predetermined threshold. Further, when a voiced sound interval is indicated by the presence of a single large peak, the present invention obtains the fundamental period of the sound by measuring the time of occurrence of the single large peak in each second short-time spectrum.

It has been observed, however, that the succession of second short-time spectra is characterized by certain irregularities in the relative magnitudes and times of occurrence of the voiced peaks, and such irregularities must be taken into account in order to obtain an accurate indication of the pitch characteristic from these peaks. One of the significant irregularities is the tendency of successive voiced peaks within a sequence of second short-time spectra to decrease in magnitude when the spectra are derived from successive speech wave segments representing a sustained voiced sound. This decrease in magnitude is especially marked at the end of a voiced interval. Since a decrease in magnitude may erroneously indicate an unvoiced sound if the voiced peak magnitudes fall below the predetermined threshold, the present invention prevents errors by automatically reducing this threshold once it has been determined that a sequence of voiced peaks is developing.

Despite this adjustment of threshold, it sometimes happens that a sequence of second short-time spectra corresponding to a voiced portion of a speech wave will contain one spectrum apparently lacking a voiced peak. Since it would be erroneous to interpret this isolated absence of a voiced peak as an indication of an unvoiced sound, the present invention interpolates a substitute voiced peak for the missing peak by taking an average of the times of occurrence of the voiced peaks in the spectra immediately preceding and immediately following the spectrum lacking a peak.

Just as a voiced peak may be occasionally absent in an isolated second short-time spectrum within a series of spectra corresponding to a voiced sound interval, it may also happen that within a sequence of spectra corresponding to an unvoiced sound an isolated second short-time spectrum may contain a single large peak exceeding the threshold due to occasional flaps of the vocal cords during a voiced interval. Since it would be erroneous to interpret this isolated peak as an indication of a voiced sound, the present invention ignores an isolated peak if it is both preceded and followed by spectra lacking voiced peaks.

It has also been observed that instead of a single large peak, two large peaks occasionally appear in a second short-time spectrum, with one of the two peaks being a true indicator of the period of the corresponding voiced sound, and the other peak being spurious. Unfortunately, the spurious peak often has a magnitude exceeding that of the true voiced peak, with the result that selection of the spurious peak as the voiced peak could result in an erroneous indication of the period of the voiced sound. The present invention avoids this source of error by comparing the time of occurrence of each currently selected peak with the average values of the times of occurrence of the immediately preceding and immediately following voiced peaks, taking into account the fact that the pitch period occasionally doubles in length within a voiced sound interval, for example, at the end of certain nasal sounds. Accordingly, the identification of an isolated spurious peak requires the concurrence of two conditions: First, the times of occurrence of the voiced peaks immediately preceding and immediately following the peak being tested must be related in such a way as to preclude a continued doubling of the pitch period for at least one spectrum beyond the spectrum containing the peak being tested. Second, the time of occurrence of the peak being tested must deviate too widely from the average value of the immediately preceding and imeediately following voiced peaks to be accounted for by natural variations in the pitch period. If both of these conditions are simultaneously present, then this invention rejects the time of ocurrence of the peak being tested as the measure of the instantaneous pitch period in favor of the average value of the times of occurrence of the immediately preceding and immediately following voiced peaks.

The invention will be fully understood from the following detailed description of illustrative embodiments thereof taken in connection with the appended drawings, in which.

Figure 5A:
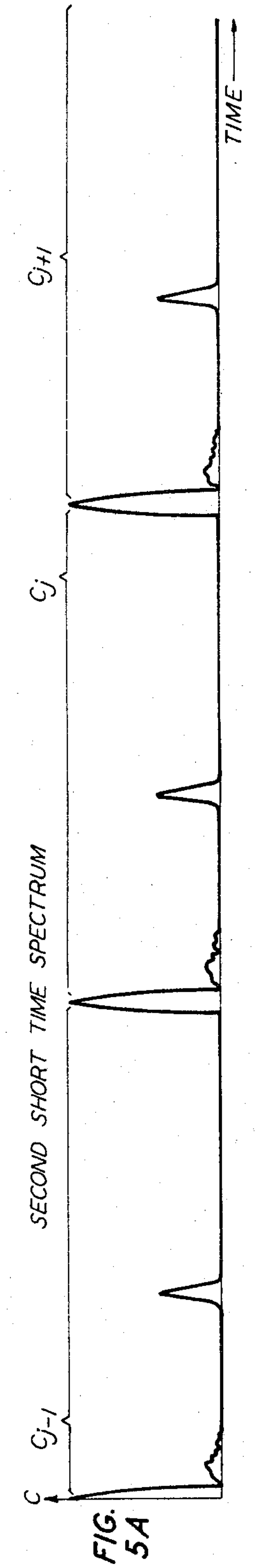
FIGS. 5A, 5B, 5C, 5D, 6A and 6B are waveform diagrams of assistance in explaining the principles of this invention.

Referring first to FIG. 5A, this drawing illustrates a sequence of second short-time spectra of the type generated by apparatus of the type shown in the copending application of A. M. Noll et al., Ser. No. 420,362, filed Dec. 22, 1964. The sequence of spectra illustrated in FIG. 5A corresponds to a voiced portion of a human speech sound, and it is observed that each of these spectra is characterized by a single, relatively large peak, a so-called voiced peak.

SUMMARY OF A SINGLE OPERATION CYCLE OF APPARATUS SHOWN IN FIGS 1, 2, 3

Figure 1:
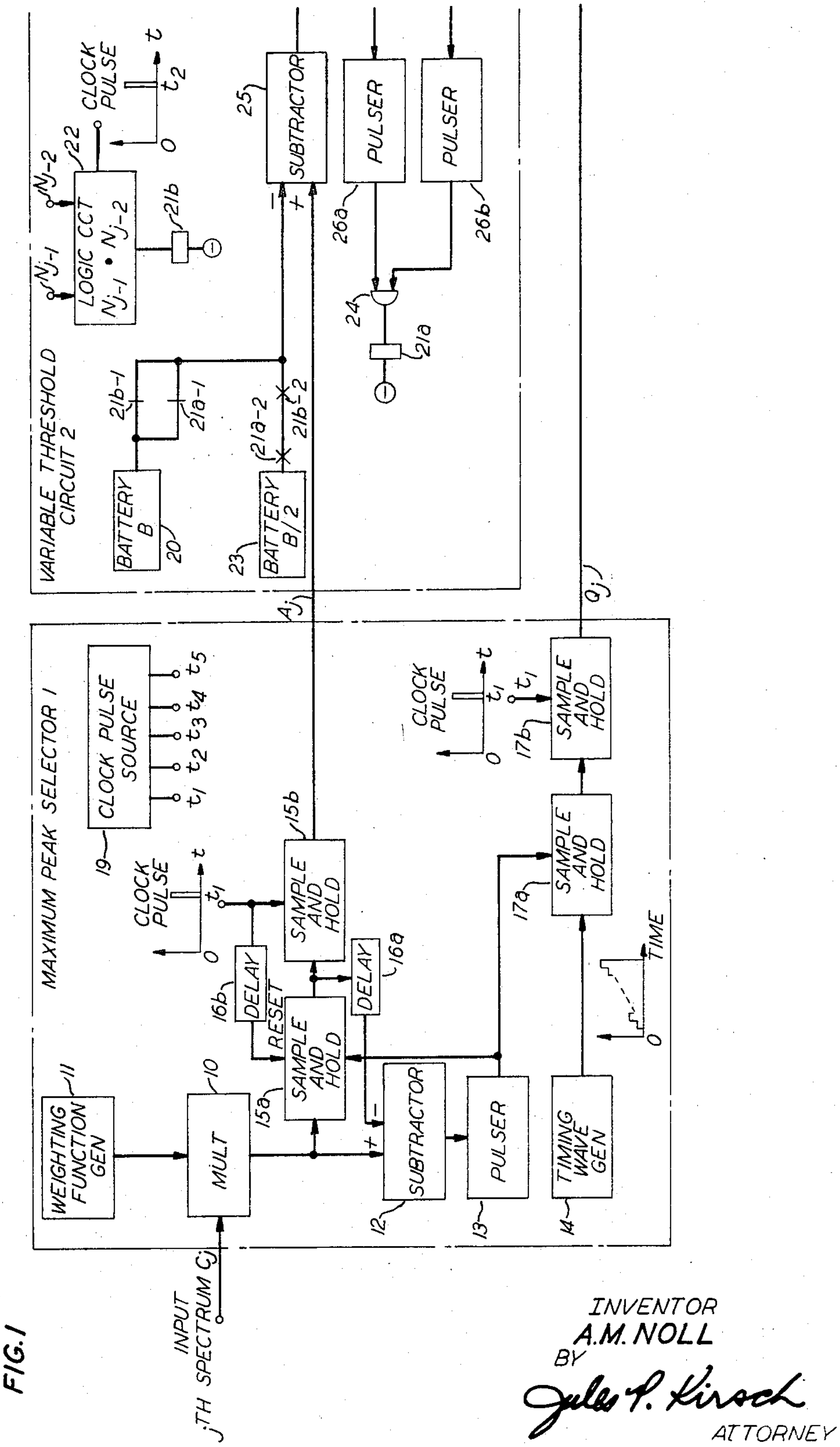
FIGS. 1, 2 and 3 illustrate in block schematic form apparatus embodying the principles of this invention.
Figure 2:
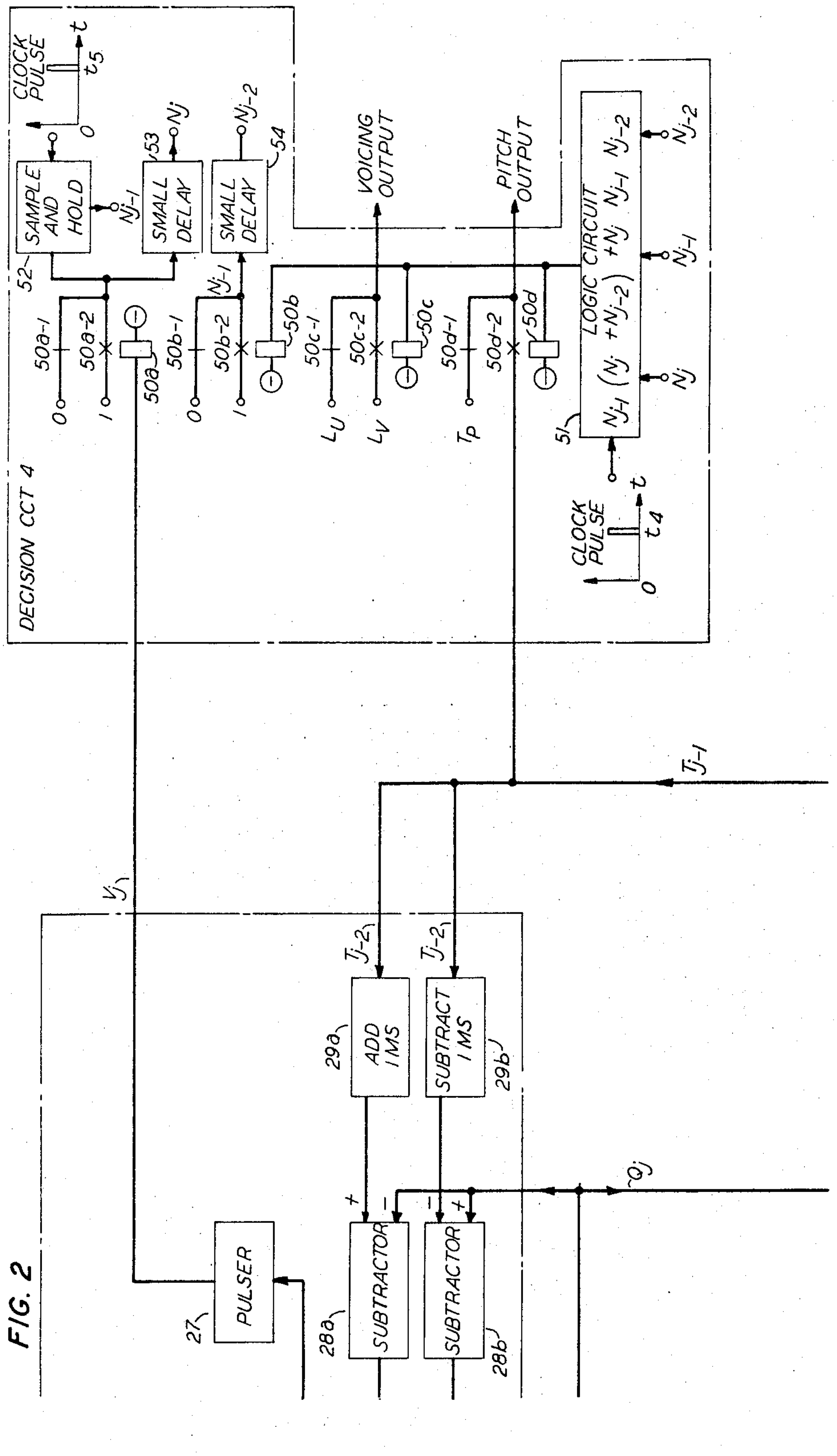
Figures 3, 4:
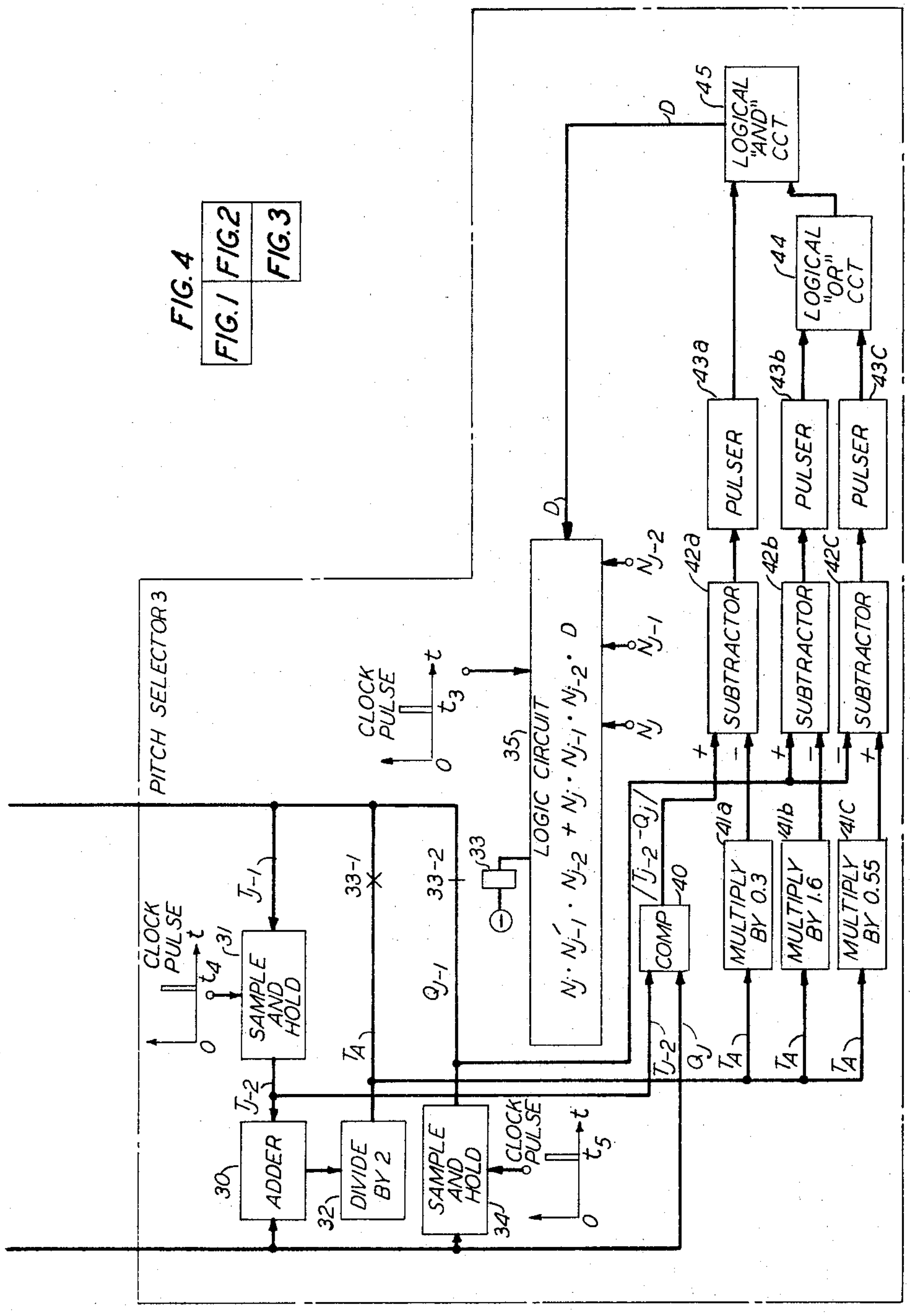
FIG. 4 is a diagram showing the relationship between FIGS. 1, 2 and 3.

Turning now to FIGS. 1, 2 and 3, these drawings illustrate in block diagram form a preferred embodiment of the principles of this invention, in which signal paths between various circuit elements are shown by single lines in order to avoid unnecessary complexity. It will be obvious to those skilled in the art at what points one or more pairs of circuits may be required to practice this invention. Starting with FIG. 1, an incoming sequence of second short-time spectra of the type shown in FIG. 5A is applied to the input terminal of maximum peak selector 1. Assuming that a sequence of spectra denoted $C_1$, $C_2$ . . . , $C_{j-2}$, $C_{j-1}$, $C_j$ . . ., has already commenced, maximum peak selector 1 selects the magnitude and time of occurence of the largest peak in each second short-time spectrum at a time $t_1$ after the last value of each spectrum has entered selector 1. For convenience, the single words "spectrum" and "spectra" will be used hereinafter as abbreviations for the expressions "second short-time spectrum" and "second short-time spectra," respectively. Also, the spectrum that has just entered selector 1 will be called the $C_j$ spectrum and the magnitude and time of occurrence of a voiced peak in this spectrum will be respectively denoted $A_j$ and $Q_j$. The quantities $A_j$ and $Q_j$ are stored in selector 1 until replaced by the magnitude $A_{j+1}$ and time of occurrence $Q_{j+1}$ of the largest peak in the next spectrum $C_{j+1}$.

Figure 5B:
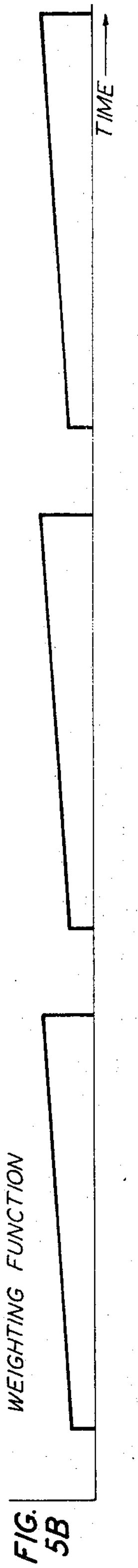
Figure 5C:
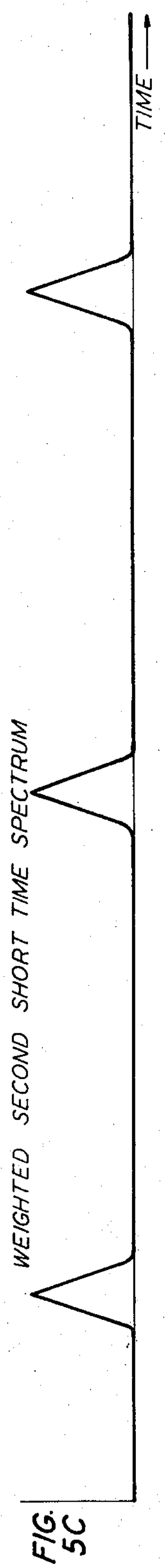
Figure 5D:
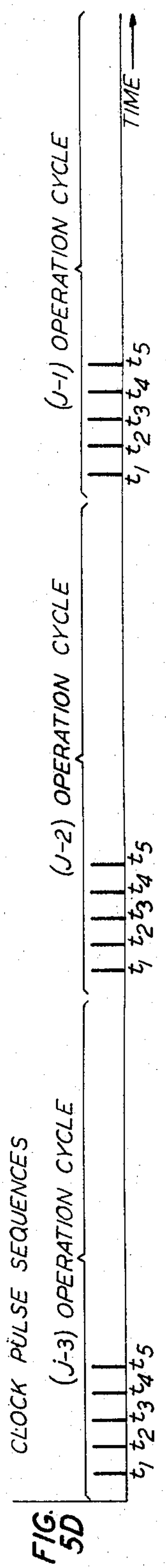

The time required for the apparatus of this invention to complete a single cycle of operation is shown in FIG. 5D, and within each operation cycle a number of successive clock pulses, $t_1$ through $t_5$, are generated. These clock pulses regulate the operation of the various components shown in FIGS. 1, 2 and 3 in a predetermined time sequence. As indicated in a comparison of FIG. 5A and FIG. 5D, the $(j-1)$ cycle commences after the last value of the $C_j$ spectrum because the magnitude and time of occurrence of the maximum peak in the $C_j$ spectrum are employed after they have been derived and to determine the periodicity of that portion of the speech sound corresponding to the preceding or $C_{j-1}$ spectrum.

While the quantities $A_j$ and $Q_j$ are stored in selector 1, a signal representative of $A_j$ is passed to variable threshold circuit 2, and a signal representative of $Q_j$ is sent to both variable threshold circuit 2 and pitch selector 3. Within variable threshold circuit 2, $Q_j$ is compared with the period $T_{j-2}$ determined by pitch selector 3 for the speech sound corresponding to the preceding $C_{j-2}$ spectrum. If a voiced peak has occurred in the preceding $C_{j-2}$ spectrum, and if $Q_j$ is sufficiently close in value to $T_{j-2}$, then at a time $t_2$ within the $(j-1)$ operation cycle the normal threshold level for determining whether a voiced peak is present in the $C_j$ spectrum is reduced in value by a predetermined amount; for example, the threshold may be reduced in value by one half, if desired. Otherwise, if either of these conditions is not met, then the threshold remains at its normal level.

Following the threshold adjustment, if any, in circuit 2, the signal representing $A_j$ is compared with the threshold to determine whether or not $A_j$ is sufficiently large to indicate the presence of a voiced peak within the $C_j$ spectrum. In the event that $A_j$ exceeds the threshold, a control signal, indicated by the letter $V_j$ in FIG. 2, is delivered to decision circuit 4 in order to indicate that a voiced peak is present in spectrum $C_j$. If $A_j$ does not exceed the threshold, no signal is delivered to decision circuit 4.

Recalling that $Q_j$ was delivered to pitch selector 3 in addition to variable threshold circuit 2, pitch selector 3 utilizes $Q_j$ to determine the period of the sound corresponding to the preceding $C_{j-1}$ spectrum, provided of course that the sound was of the voiced variety. In determining the period of the preceding $C_{j-1}$ spectrum, pitch selector 3 takes into account the irregularities previously mentioned: (a) in a succession of three spectra the middle spectrum may not have had a voiced peak but the two adjoining spectra have had voiced peaks; (b) a spectrum may have had more than one large peak, only one of which is the true voiced peak; and (c) a spectrum may have had a voiced peak that occurs at twice the period of the voiced peak in the preceding spectrum. The period determined by selector 3 is represented by a signal denoted $T_{j-1}$, and this period signal is delivered to both variable threshold circuit 2 and decision circuit 4. It is to be observed that the $T_{j-1}$ signal is obtained at a time $t_3$ within the $(j-1)$ operation cycle, hence the $T_{j-1}$ signal delivered to variable threshold circuit 2 is not utilized until time $t_2$ of the next or $(j)$ operation cycle, at which time it is the time of occurrence $Q_{j+1}$ of the $C_{j+1}$ spectrum that is under consideration in circuit 2. Accordingly, when the time of occurrence $Q_j$ is under consideration in circuit 2, the period signal from pitch selector 3 was derived during the preceding or $(j-2)$ operation cycle and refers to the period $T_{j-2}$ of the preceding $C_{j-2}$ spectrum.

In decision circuit 4, it is determined whether the sound corresponding to the $C_{j-1}$ spectrum is voiced or unvoiced by examining the three adjacent spectra, $C_{j-2}$, $C_{j-1}$ and $C_j$, for the presence of voiced peaks under certain conditions of successive occurrence explained in detail below. If it is determined that the sound corresponding to the $C_{j-1}$ spectrum is voiced, then the $T_{j-1}$ signal is taken to represent the period of the corresponding voiced sound. On the other hand, if it is determined that the sound corresponding to the $C_{j-1}$ spectrum is unvoiced, then a suitable arbitrary period represented by the signal $T_p$ is used until it is established by circuit 4 that another voiced interval has commenced. In addition, circuit 4 generates a voiced-unvoiced control signal symbolized by $L_v$, $L_u$, respectively indicative of whether the sound corresponding to the $C_{j-1}$ spectrum is voiced or unvoiced.

DESCRIPTION OF CIRCUIT DETAILS

Turning back to FIG. 1, as an incoming second short-time spectrum $C_j$ enters maximum peak selector 1, it is multiplied by a suitable sequence of weighting factors in order to enhance the unambiguous detection of voiced peaks. It has been empirically observed that voiced speech sounds with longer periods have second short-time spectra with peaks that have smaller magnitudes than voiced speech sounds with shorter periods, that is, the magnitude of a voiced peak in a second short-time spectrum is inversely proportional to the length of the period of the corresponding speech sound. Therefore, accurate detection of voiced peaks requires either a variable threshold or a suitable weighting of the second short-time spectra. In this invention, the latter approach was preferred, in that each incoming spectrum is applied to a conventional multiplier 10 together with a weighting signal from weighting function generator 11. As indicated in the waveform diagrams in FIGS. 5A, 5B and 5C, multiplication by a suitable weighting function eliminates unwanted peaks that occur at the beginning of each spectrum and enhances the voice peaks which may be present in the spectrum. FIG. 5B illustrates a sequence of ramp-shaped weighting functions covering a selected portion of the total interval occupied by an incoming spectrum, with the initial portion of each weighting function being made equal to zero in order to eliminate unwanted peaks at the beginning of each spectrum.

The weighted spectrum output of multiplier 10 is passed to one of the input terminals of a subtractor circuit 12 and to a pair of tandem connected sample and hold circuits **15*a* and 15*b*. Circuits 15*a* and 15*b* are of identical construction and are designed in well-known fashion to perform a sample and hold operation only in response to a control pulse. Further, the value obtained in each sample and hold operation is made to appear continuously at the output terminal of the circuit until replaced by the value obtained in the next sample and hold operation. Subtractor circuit 12 is a conventional circuit for indicating that the magnitude of the signal applied to one of its terminals, for example the terminal indicated by the symbol "+," exceeds the magnitude of the signal applied to its other terminal, indicated in the drawing by the "−" sign. Control pulses for operating circuits 15*a* and 15*b* are respectively obtained from pulser 13 and clock pulse source 19, where pulser 13 may be a conventional monostable multivibrator, and source 19** may be of well-known design for producing a sequence of uniform clock pulses spaced apart at predetermined intervals of time.

The magnitude of the largest peak in a weighted spectrum from multiplier 10 is obtained in the following manner. When the first weighted spectrum value is applied to subtractor 12 at the beginning of each operation cycle, circuit **15*a* has a zero signal level at its output terminal so that the first non-zero value in the incoming spectrum which is above a certain minimum level causes subtractor 12 to develop an output signal that triggers pulser 13 to deliver a control pulse to circuit 15*a*. Since the weighted spectrum is simultaneously applied to circuit 15*a* and subtractor 12, the receipt of a control pulse causes circuit 15*a* to sample this first non-zero value of the incoming spectrum and to develop at its output terminal a signal level representative of this sampled non-zero value. The sampled signal level obtained by circuit 15*a* is returned via a delay element 16*a* to subtractor 12, element 16*a* serving to delay the sampled value by a suitable time interval in order to allow a new portion of the incoming weighted spectrum to be applied to subtractor 12 before comparing the weighted spectrum with the sampled value. In order for the sampled value stored in circuit 15*a* to be replaced, it is necessary that a subsequent value greater than the preceding sampled value appear in the incoming spectrum, it being understood that the subsequent spectrum value must exceed the stored sampled value by more than a predetermined minimum amount. Each time that a subsequent spectrum value exceeds the preceding sampled value, circuit 15*a* is operated by a control pulse from pulser 13 to sample this subsequent value of the incoming spectrum and to store this subsequent sampled value in place of the preceding sample value. Therefore, by the time that all of the values of the $C_j$ spectrum have been applied to subtractor 12, the sampled value held at the output terminal of circuit 15*a*** indicates the maximum value, denoted $A_j$, of all of the $C_j$ spectrum values.

The maximum value appearing at the output terminal of circuit 15$a$ is made available for further processing in the apparatus of this invention by a first clock pulse, $t_1$, which is supplied as a control pulse to circuits 15$a$ and 15$b$ by generator 19 at a time $t_1$ coinciding with or following the last value of each incoming spectrum and prior to the first value of the next following spectrum. The $t_1$ clock pulse from source 19 operates sample and hold circuit 15$b$ to sample and hold the last sampled value held at the output terminal of circuit 15$a$, thereby to effect a transfer of the maximum spectrum value to the output terminal of circuit 15$b$. The $t_1$ clock pulse is also delivered to circuit 15$a$ via delay element 16$b$ to reset circuit 15$a$ to have a zero signal level at its output terminal for the next incoming spectrum.

Determination of the time of occurrence of the maximum spectrum value is provided by the tandem arrangement of a timing wave generator 14 and sample and hold circuits 17$a$ and 17$b$. Generator 14 supplies a timing wave, for example, a sequence of pulses of successively greater amplitudes at corresponding succesive instants of time, to circuit 17$a$. Circuit 17$a$ is operated in response to the control pulse from pulser 13 so that at the same time that circuit 15$a$ is sampling a spectrum value, circuit 17$a$ is sampling a timing wave value representing the instant of time at which the spectrum value is sampled. Each time that circuit 15$a$ is operated by a control pulse from pulser 13, circuit 17$a$ is simultaneously operated so that the time of occurrence of the subsequent spectrum value is stored in circuit 17$a$ in place of the preceding time of occurrence. Therefore, after the termination of an incoming spectrum, the timing wave amplitude appearing at the output terminal of circuit 17$a$ indicates the time of occurrence, $Q_j$, of the maximum spectrum value $A_j$ appearing at the output terminal of circuit 15$a$. The clock pulse $t_1$ at the end of the spectrum operates circuits 17$a$ and 17$b$ to effect a transfer of the quantity $Q_j$ from the output terminal of circuit 17$a$ to the output terminal of circuit 17$b$ in order to make $Q_j$ available for further processing.

The next step in an operation cycle, following the detection of the maximum spectral amplitude and its time of occurrence, is the determination in variable threshold circuit 2 of whether the maximum spectrum amplitude $A_j$ represents a voiced peak. Within variable threshold circuit 2, the maximum amplitude signal $A_j$ is applied to the subtrahend terminal of subtractor 25, indicated by a "+" symbol, and an appropriate threshold signal is applied to the minuend terminal of subtractor 25, indicated by a "—" symbol. If $A_j$ exceeds the threshold, an output signal is developed by subtractor 25, and this output signal is passed to pulser 27 to produce a control pulse denoted $V_j$. Pulser 27 may be of the same construction as pulser 13 in selector 1, and the $V_j$ control pulse produced by pulser 27 is delivered to decision circuit 4 which develops a pair of pitch and voicing signals indicative of the pitch characteristic of the corresponding portion of the original speech wave from which the $C_j$ spectrum was obtained.

Variable threshold circuit 2 adjusts the threshold level against which $A_j$ is compared in subtractor 25 in order to take into account the possibility of a decrease in the magnitudes of voiced peaks in a sequence of spectra corresponding to a sustained voiced sound. A single fixed threshold level is not satisfactory, since voiced peak amplitudes could decrease to a point below such a fixed threshold, thereby resulting in an erroneous classification of the corresponding speech sound as unvoiced instead of voiced. Two criteria are used to determine whether the maximum value $A_j$ of the $C_j$ spectrum is part of a sequence of voiced peaks all derived from the same sustained voiced sound: (1) the time of occurrence $Q_j$ of the maximum value $A_j$ must correspond closely to the period $T_{j-2}$ derived from the preceding $C_{j-2}$ spectrum, that is $Q_j$ must satisfy the relationship $$(T_{j-2}+\Delta T)\geq Q_j\geq(T_{j-2}-\Delta T) \quad (1)$$

where $\Delta T$ is a time interval that is small relative to the usual range of values for the period; and (2) each of the two preceding spectra $C_{j-1}$ and $C_{j-2}$ must have contained a voiced peak. If both of these criteria are met, then the threshold against which $A_j$ is compared is lowered by a predetermined amount.

The time of occurrence signal $Q_j$ is compared in subtractors 28$a$ and 28$b$ with signals representative of $(T_{j-2}+\Delta T)$ and $(T_{j-2}-\Delta T)$ respectively supplied by circuits 29$a$ and 29$b$, where $\Delta T$ may be on the order of one millisecond. Circuits 29$a$ and 29$b$ respectively develop signals representative of $(T_{j-2}+\Delta T)$ and $(T_{j-2}-\Delta T)$ from the period signal $T_{j-2}$ derived by pitch selector 3. In order to satisfy the relationship $$(T_{j-2}+\Delta T)\geq Q_j\geq(T_{j-2}-\Delta T) \quad (2)$$

subtractors 28$a$ and 28$b$ must both produce an output signal. Accordingly, each subtractor 28$a$ and 28$b$ is followed by a corresponding pulser 26$a$, 26$b$, for example, a conventional monostable multivibrator circuit, and whenever subtractors 28$a$ and 28$b$ both produce an output signal then pulsers 26$a$ and 26$b$ are both triggered to their unstable states. The output terminals of pulsers 26$a$ and 26$b$ are connected to the terminals of an AND gate 24 so that when the subtractors 28$a$ and 28$b$ both produce an output signal to trigger pulsers 26$a$ and 26$b$, the resulting output pulses developed by pulsers 26$a$ and 26$b$ enable gate 24 thereby to provide a control pulse of fixed duration to energize relay 21$a$.

Relay 21$a$, which may be of any desired construction, is provided with two sets of contacts, normally open contacts 21$a$–1 and normally closed contacts 21$a$–2. Contacts 21$a$–1 are placed in a path between energy source 20 and the minuend terminal of subtractor 25, and contacts 21$a$–2 are placed in a path between energy source 23 and the minuend terminal of subtractor 25. Source 20 provides the normal threshold level, while source 23 provides the reduced threshold level; for example, if B denotes the normal threshold level provided by source 20 then one half of the normal threshold level or $B/2$ may be provided by source 23, it being understood that reduced threshold levels other than one half of the normal threshold level may be used if desired.

In its de-energized condition, relay 21$a$ connects source 20 via normally closed contacts 21$a$–1 to the minuend terminal of subtractor 25 while normally open contacts 21$a$–2 prevent the connection of source 23 to the minuend terminal of subtractor 25. On the other hand, when the first condition necessary for a reduction of threshold is met, a control pulse from gate 24 energizes relay 21$a$ to open contacts 21$a$–1 and close contacts 21$a$–2. However, the meeting of this first condition alone does not effect a change in the threshold level applied to subtractor 25, since contacts 21$b$–1 and 21$b$–2 of relay 21$b$ respectively connect and block paths between sources 20 and 23 and subtractor 25.

Relay 21$b$ is energized when the second condition is met, as evidenced by a control pulse emitted by logic circuit 22, that is, relay 21$b$ is energized when circuit 22 determines that each of the two preceding spectra, $C_{j-2}$ and $C_{j-1}$, has contained a voiced peak. Circuit 22 makes this determination on the basis of the presence or absence of logic control signals supplied by decision circuit 4 and respectively denoted $N_{j-2}$ and $N_{j-1}$, where the presence or absence of an $N_{j-2}$ logic control signal respectively indicates the presence or absence of a voiced peak in the $C_{j-2}$ spectrum, and the presence or absence of an $N_{j-1}$ logic control signal respectively indicates the presence or absence of a voiced peak in the $C_{j-1}$ spectrum. If both signals are present, then logic circuit 22, which may be a conventional AND logic circuit, generates an output signal that serves as a control pulse to energize relay 21$b$. The energizing of relay 21$b$ opens contacts 21$b$–1 and closes contacts 21$b$–2, and if relay 21$a$ is simultaneously energized, then the paths between source 20 and subtractor 25 are blocked, while the path between source 23 and subtractor 25 is opened, thereby to provide a reduced threshold level for determining whether $A_j$ is a voiced peak.

The period $T_{j-1}$ of the speech sound corresponding to the preceding $C_{j-1}$ spectrum, is derived by pitch selector 3 in accordance with the following criteria, where the subscript $(j-1)$ refers to the spectrum preceding the $C_j$ spectrum. In general, the quantity $Q_{j-1}$ is taken as the speech period $T_{j-1}$, unless it is found that the quantity $Q_{j-1}$ cannot be relied upon, in which case an appropriate average value is derived from the times of occurrence of the voiced peaks in the immediately adjacent $C_j$ and $C_{j-2}$ spectra, this average value being denoted $T_A$. There are two conditions under while $Q_{j-1}$ is replaced by $T_A$ as the period $T_{j-1}$: (1) there is an absence in the $C_{j-1}$ spectrum of a peak exceeding the threshold established by variable threshold circuit 2; or (2) the peak in the $C_{j-1}$ spectrum has a time of occurrence which differs so widely from the times of occurrence of the peaks in the immediately adjacent $C_j$ and $C_{j-2}$ spectra that the $C_{j-1}$ spectrum peak is considered to be a spurious or false voiced peak which must be disregarded.

Selection of $T_A$ or $Q_{j-1}$ to be the period $T_{j-1}$ of the speech sound corresponding to the $C_{j-1}$ spectrum is controlled by logic circuit 35 in cooperation with relay 33. Logic circuit 35 generates an output signal at a time $t_3$ in response to a clock pulse from clock pulse source 19 to energize relay 33 provided that either of the two conditions explained above exists. The logic control signals applied to circuit 35 are $N_j$, $N_{j-1}$, and $N_{j-2}$ from decision circuit 4, as well as a logic control signal D generated within pitch selector 3 in the manner described below. The first condition, that is, the absence in the $C_{j-1}$ spectrum of a peak exceeding the threshold set by circuit 2, may be written in conventional logic notation as $N_jN'_{j-1}N_{j-2}$, as shown within the block representing circuit 35 in FIG. 3, where the prime symbol (′) indicates the negation of the quantity to which it is affixed. Similarly, the second condition, that is, the occurrence of an isolated, spurious peak in the $C_{j-1}$ spectrum, is written symbolically as $N_jN_{j-1}N_{j-2}D$, also shown within the block representing circuit 35 in FIG. 3, where the logic control signal D indicates the presence of a spurious peak in the $C_{j-1}$ spectrum. Further, the plus sign between $N_jN'_{j-1}N_{j-2}+N_jN_{j-1}N_{j-2}D$ within the box labelled circuit 35 in FIG. 3 indicates the logical "OR" operation, so that logic circuit 35 generates an output signal at time $t_3$ under either of these two conditions.

Relay 33 is provided with two sets of contacts 33–1 and 33–2, 33–1 being normally closed and 33–2 being normally open. Contacts 33–2 are interposed between the $Q_{j-1}$ signal obtained at time $t_5$ in the prior operation cycle by sample and hold circuit 34 so that $Q_{j-1}$ is selected to be the period signal $T_{j-1}$ for the $C_{j-1}$ spectrum in the absence of an output signal from circuit 35. However, if circuit 35 produces an output signal, then relay 33 is energized, thereby closing contacts 33–1 and opening contacts 33–2 to select the average signal $T_A$ to be the period signal $T_{j-1}$ for that portion of the speech sound corresponding to the $C_{j-1}$ spectrum. The average signal $T_A$ is derived by combining the incoming $Q_j$ signal and the previously derived period signal $T_{j-2}$ in adder 30 and dividing the resulting sum signal by a factor of 2 in divider circuit 32. The period signal $T_{j-1}$ derived in one operation cycle is converted into the period signal of the preceding or $C_{j-2}$ spectrum by passing the $T_{j-1}$ signal through sample and hold circuit 31, which is operated at a time $t_4$ within each operation cycle and held over until the following operation cycle.

Derivation of the D signal is accomplished in the following manner.

Figure 6B:
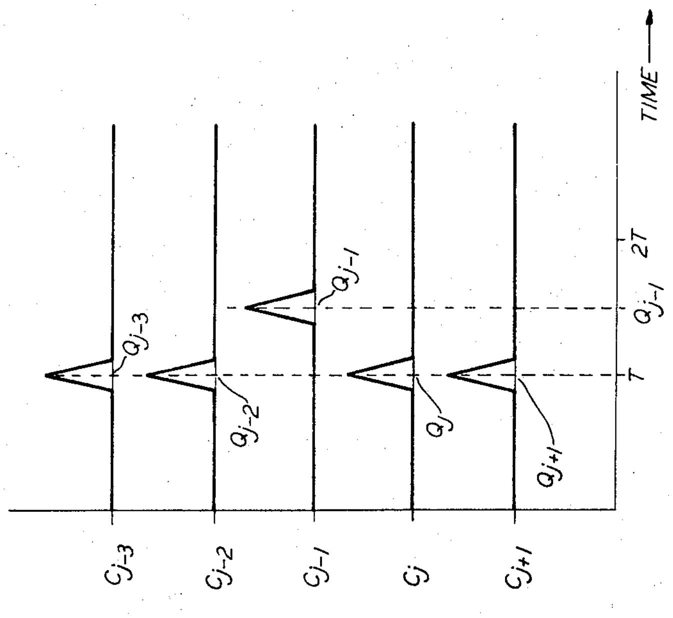
Figure 6A:
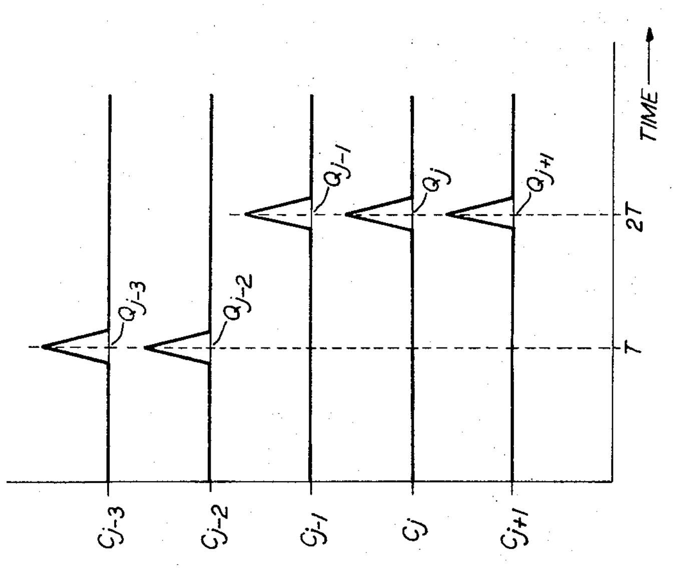

Referring first to FIGS. 6A and 6B, these drawings illustrate graphically two possible explanations for an abrupt change in the time of occurrence of the voiced peaks in a sequence of spectra. In the sequence of spectra shown in FIG. 6A, there has occurred a doubling of the period of the speech sound beginning at some point in time between the $C_{j-2}$ and the $C_{j-1}$ spectra, where $Q_{j-1}=2Q_{j-2}$, and continuing for several periods as illustrated by the times of occurrence $Q_j$, $Q_{j+1}$ of subsequent spectra which are also doubled in value relative to the preceding times of occurrence $Q_{j-2}$, $Q_{j-3}$. FIG. 6B, on the other hand, illustrates the occurrence of an isolated spurious peak in the $C_{j-1}$ spectrum, since the subsequent $C_j$ and $C_{j+1}$ spectra have peaks occurring at the same times as the peaks in the preceding $C_{j-3}$ and $C_{j-2}$ spectra.

The present invention distinguishes between an isolated spurious peak of the type shown in FIG. 6B and a peak representing true doubling of the speech period which continues for a number of periods as shown in FIG. 6A by the following logical arrangement. In comparator 40 of pitch selector 3 in FIG. 3, a signal representing the absolute difference between $T_{j-2}$ and $Q_j$ is developed, and this absolute difference signal, denoted $|T_{j-2}-Q_j|$, is subtracted in subtractor 42*a* from a selected fraction of the average period signal $T_A$ developed by multiplier 41*a*. A suitable fraction has been found to be on the order of 0.3, but of course other fractions may be employed as required or desired. Since $T_A$ represents the average of $T_{j-2}$ and $Q_j$, if the absolute difference $|T_{j-2}-Q_j|$ exceeds $0.3T_A$, that is, if $$|T_{j-2}-Q_j|-0.3T_A>0 \quad (3)$$

then it is considered that a doubling of the period has occurred at some point in time between the $C_{j-2}$ spectrum and the $C_j$ spectrum and has continued beyond the $C_{j-1}$ spectrum, therefore the time of occurrence $Q_{j-1}$ of the maximum peak in the $C_{j-1}$ spectrum could represent the beginning of a doubling of the speech period.

This situation is illustrated by FIG. 6A in which it is observed that the average of $Q_j$ and $Q_{j-2}$ is on the order of $1.5Q_{j-2}$, whereas the absolute difference between $Q_{j-2}$ and $Q_j$ is on the order of $1.0Q_{j-2}$. Hence if the absolute difference $|T_{j-2}-Q_j|$ exceeds 0.3 of the average $T_A$, then $Q_{j-1}$ can be considered to represent the time of occurrence of a voiced peak corresponding to the start of a doubling of the pitch period since there is at least one spectrum, $C_j$, following the $C_{j-1}$ spectrum in which there is a peak also representing a continued doubling of the pitch period.

On the other hand, if the absolute difference $|T_{j-2}-Q_j|$ does not exceed 0.3 of the average $T_A$, then $Q_{j-1}$ cannot represent the start of a doubling of the pitch period, thereby satisfying one of the two necessary conditions for $Q_{j-1}$ to represent the time of occurrence of an isolated spurious peak. The second concurrent condition necessary for $Q_{j-1}$ to be considered spurious is that $Q_{j-2}$ must deviate too far from the average $T_A$ to be acounted for by natural variations in the pitch period. This is shown in FIG. 6B, where the average of $Q_j$ and $Q_{j-2}$ is on the order of $1.0Q_{j-2}$ and the absolute difference between $Q_{j-2}$ and $Q_j$ is on the order of zero.

In order to determine whether $Q_{j-1}$ deviates too widely from the average $T_A$, $Q_{j-1}$ is compared with two fractions of $T_A$, one greater than unity, for example, 1.6, and the other less than unity, for example, 0.55, it being understood that other fractions may be employed. In the apparatus shown in FIG. 3, this is accomplished by passing the $T_A$ output signal of divider 32 through multipliers 41*b* and 41*c*, followed by application of the resulting respective $1.6T_A$ and $0.55T_A$ signals to the subtrahend terminals of subtractors 42*b* and 42*c*. The $Q_{j-1}$ signal held by sample and hold circuit 34 from the preceding operation cycle is applied to minuend terminals of subtractors 42*b* and 42*c*, and if at least one of the subtractors develops an output signal indicating that $Q_{j-1}$ either exceeds $1.6T_A$ or is smaller than $0.55\ T_A$, then the corresponding one of pulsers 43*b* and 43*c* generates an output pulse which is delivered via a logical "OR" circuit 44 to logical "AND" circuit 45. In the event that the first condition necessary for $Q_{j-1}$ to be spurious has been satisfied, as indicated by the absolute difference signal $|T_{j-2}-Q_j|$ exceeding $0.3T_A$, then pulser 43*a* following subtractor 42*a* also develops an output pulse which is delivered to circuit 45.

The simultaneous presence of pulses from circuit 43*a* and 44 causes circuit 45 to produce D signal referred to above, it being recalled that the presence of a D signal indicates that $Q_{j-1}$ represents the time of occurrence of a spurious voiced peak in the $C_{j-1}$ spectrum, which in conjunction with the presence of peaks exceeding the threshold of circuit 2 in each of the $C_j$, $C_{j-1}$, and $C_{j-2}$ spectra causes logic circuit 35 to operate relay 33 to select $T_A$ instead of $Q_{j-1}$ to represent the period of the speech sound corresponding to the $C_{j-1}$ spectrum.

Turning back to FIG. 2, decision circuit 4 derives a set of logic control signals $N_j$, $N_{j-1}$, and $N_{j-2}$, each of which represents the presence or absence of a voiced peak in the corresponding $C_j$, $C_{j-1}$, and $C_{j-2}$ spectra. Circuit 4 also develops a pair of pitch control signals, a voiced-unvoiced signal indicative of whether the speech sound corresponding to the $C_{j-1}$ spectrum is voiced or unvoiced, and a period signal indicative of the period of the speech sound corresponding to the $C_{j-1}$ spectrum if that sound is voiced. It is important to observe that the logic and pitch control signals developed by circuit 4 are derived at different instants of time within a single operation cycle of this invention, and therefore in order to relate the quantities represented by these signals to the correct spectrum it is necessary to refer each quantity to its corresponding clock pulse within a specific operation cycle.

The $N_j$ and $N_{j-1}$ logic control signals are derived by applying $V_j$ control pulse from variable threshold circuit 2 to relay 50*a*. Relay 50*a* is provided with two sets of contacts 50*a*–1 and 50*a*–2 which are respectively interposed between sample and hold circuit 52 and signal sources (not shown) supplying different signal levels denoted "0" and "1." Contacts 50*a*–1 are normally closed and contacts 50*a*–2 are normally open so that in the absence of a $V_j$ control pulse, the "0" signal level is applied to circuit 52, whereas the presence of a $V_j$ control pulse operates relay 50*a* to apply the "1" level to circuit 52. Thus the absence or presence of a voiced peak in the $C_j$ spectrum is respectively indicated by whether the "0" or "1" signal level is applied to circuit 52.

Circuit 52 is not operated until the end of an operation cycle at time $t_5$ by a $t_5$ clock pulse from source 19 to sample the applied signal level, since the logic control signal developed by circuit 52 is not to be used until the next following operation cycle. Hence the output signal of circuit 52 is denoted $N_{j-1}$ to indicate that the output signal of circuit 52 is used to represent the presence or absence of a voiced peak in the $C_{j-1}$ spectrum in logic circuits 22, 35, and 51.

The "0" or "1" signal level passed by relay 50*a* is also passed through a delay element 53 to form a logic control signal $N_j$ which is used in the $(j-1)$ operation cycle to indicate the respective absence or presence of a voiced peak in the present or $C_j$ spectrum. Delay element 53 delays the "0" or "1" signal level by a sufficient time to prevent a race condition.

Relays 50*b*, 50*c*, and 50*d* are controlled simultaneously by logic circuit 51 to produce the $N_{j-2}$ logic control signal and the pair of pitch control signals mentioned above. Logic circuit 51, which is operated at time $t_4$ within each operation cycle, determines from the three logic control signals $N_j$, $N_{j-1}$, and $N_{j-2}$ whether a voiced peak was present in the preceding or $C_{j-1}$ spectrum according to three criteria. A voiced peak is determined to be present in the $C_{j-1}$ spectrum if either (1) the adjacent $C_{j-1}$ and $C_j$ spectra both have peaks exceeding the threshold established by circuit 2; or (2) the adjacent $C_{j-2}$ and $C_{j-1}$ spectra both have peaks exceeding the threshold established by circuit 2; or (3) the $C_{j-1}$ spectrum does not have a peak exceeding the threshold established by circuit 2 but the immediately preceding $C_{j-2}$ spectrum and the immediately following $C_j$ spectrum do have peaks exceeding the threshold. In symbolic notation these three criteria may be expressed by the following identity:

$$N_{j-1}(N_j+N_{j-2})+N_jN'_{j-1}N_{j-2}=N_{j-1}N_j+N_{j-1}N_{j-2}+N_jN'_{j-1}N_{j-2} \quad (4)$$

The response of logic circuit 51 to a clock pulse at time $t_4$ therefore depends on whether any one of the three criteria expressed by relationship 4 is met. If none of the criteria is met, then circuit 51 produces no output signal and relays 50*b*, 50*c*, and 50*d* remain in their de-energized state, whereas in the event that at least one of these criteria is met, then circuit 51 produces an output signal. In the de-energized condition the normally closed contacts 50*b*–1 of relay 50*b* convey a "0" level signal from a suitable source (not shown) to the input terminal of delay element 54, this "0" level signal indicating that no voice peak is present in the $C_{j-1}$ spectrum. In the energized condition of relay 50*b*, the normally closed contacts 50*b*–1 are open and the normally open contacts 50*b*–2 are closed, thereby conveying a "1" level signal from a suitable source (not shown) to delay element 54 to indicate the presence of a voiced peak in the $C_{j-1}$ spectrum. Atlhough the "0" and "1" levels of the signals applied to element 54 constitute the two levels of the logic control signal representing the presence or absence of a voiced peak in the $C_{j-1}$ spectrum relative to the current operation cycle, this logic control signal is not used until the next operation cycle. Hence delay element 54 causes the incoming "0" and "1" level signals to be delayed for a suitable interval of time so that the output signal of element 54 will be the $N_{j-2}$ logic control signal signifying the presence or absence of a voiced peak in the preceding $C_{j-2}$ spectrum.

In the case of relay 50*c*, in its de-energized state normally closed contacts 50*c*–1 connect a suitable signal source (not shown) having a predetermined output signal level denoted $L_U$ to the voiced-unvoiced terminal of circuit 4 to indicate that the speech sound corresponding to the $C_{j-1}$ spectrum is unvoiced, based upon the absence of a voiced peak in the $C_{j-1}$ spectrum. On the other hand, in its energized or operated state, relay 50*c* opens its normally closed contacts 50*c*–1 and closes normally open contacts 50*c*–2, thereby connecting an appropriate signal source (not shown) having a predetermined output signal level $L_V$ to the voiced-unvoiced output terminal of circuit 4. The $L_V$ signal indicates that the speech sound corresponding to the $C_{j-1}$ spectrum is voiced, based upon the presence of a voiced peak in the $C_{j-1}$ spectrum.

Relay 50*d* is provided with two sets of contacts, normally closed contacts 50*d*–1 and normally open contacts 50*d*–2. When logic circuit 51 signals that the $C_{j-1}$ spectrum contains a voiced peak, thereby operating relay 50*d*, contacts 50*d*–1 are open and contacts 50*d*–2 are closed in order to deliver the $T_{j-1}$ period signal developed by pitch selector 3 to the period output terminal of circuit 4. In the absence of a voiced peak in the $C_{j-1}$ spectrum relay 50*d* is in its de-energized state, and contacts 50*d*–1 deliver a suitable constant period signal denoted $T_P$ from on appropriate source (not shown) to the period output terminal of circuit 4.

Although this invention has been described in terms of detecting the period of speech sounds from a second short-time spectrum which is the logarithm of the speech spectrum, it is to be understood that applications of this invention also include detection of periodicity in other functions and waveforms derived from human speech. In addition, it is to be understood that the above-described embodiments of the principles of this invention are merely illustrative of the numerous arrangements that may be devised from the principles of this invention by those skilled in the art without departing from the spirit and scope of the invention.

What is claimed is:

1. Apparatus for determining the periodicity of voiced portions of a speech wave from a succession of spectrum waveforms each of which is representative of the Fourier transform of the logarithm of the spectrum of corresponding successive segments of said speech wave which comprises peak selector means supplied with said succession of spectrum waveforms for deriving from each of said spectrum waveforms first and second control signals respectively representative of the magnitude and time of occurrence of the largest peak in each of said waveforms, adjustable threshold means responsive to said first and second control signals for generating an output pulse for each of said waveforms in which there is a largest peak that exceeds an adjustable threshold level characterized by a higher level and a lower level, and pitch selector means supplied with said second control signal from said peak selector means for obtaining for each of said spectrum waveforms a third control signal respresentative of the period of the speech wave segment corresponding to said spectrum waveform, wherein said third control signal represents the time of occurrence of the largest peak in each spectrum waveform in which the largest peak exceeds said threshold level and a selected average of the times of occurrence of the largest peaks in the spectrum waveforms immediately preceding and immediately following a spectrum waveform in which the largest peak either does not exceed said threshold level or deviates too widely from the times of occurrence of the largest peaks in the immediately preceding and immediately following spectrum waveforms.

2. Apparatus as defined in claim 1 wherein said adjustable threshold means comprises first means for comparing the second control signal derived from each spectrum waveform with the third control signal obtained from a selected preceding spectrum waveform to obtain a first threshold control signal for each spectrum waveform in which the largest peak has a time of occurrence that does not differ by more than a pre-set amount from the period of the speech wave segment corresponding to said preceding spectrum waveform, logic means responsive to successive pairs of first and second logic control signals, each pair of which respectively indicates the presence or absence of peaks in the first and second spectrum waveforms immediately preceding the spectrum waveform from which said second control signal is derived, for producing a second threshold control signal for each pair of logic control signals that indicates the presence of peaks in each of said first and second immediately preceding spectrum waveforms, switching means controlled by said first and second threshold control signals for selecting said lower level of said adjustable threshold level in response to the simultaneous presence of said first and second threshold control signals and said higher level in response to the absence of either or both of said first and second threshold control signals, and second means for comparing said first control signal with the threshold level selected by said switching means to generate an output pulse for each of said spectrum waveforms in which there is a peak that exceeds said selected threshold level.

3. Apparatus as defined in claim 1 wherein said pitch selector comprises averaging means for deriving an average signal representative of said selected average from each $j$ second control signal and a corresponding $(j-2)$ third control signal representing the period of the speech wave segment corresponding to the $(j-2)$ spectrum waveform, where $j$ is a selected positive integer, comparator means for obtaining from each $j$ second control signal and each corresponding $(j-2)$ third control signal an absolute value signal indicative of the absolute value of the difference in magnitude between the quantities represented by each $j$ second control signal and each corresponding $(j-2)$ third control signal, a plurality of subtractor means for comparing said absolute value signal with a corresponding plurality of selected different weighted values of said average signal to obtain for each $j$ second control signal a first logic control signal indicative of whether each $(j-1)$ second control signal represents a time of occurrence that deviates too widely from the times of occurrence of the largest peaks in the $(j-2)$ and $j$ spectrum waveforms respectively preceding and following the $(j-1)$ spectrum waveform, and means in circuit relation with said averaging means, comparator means, and subtractor means for selecting either said $(j-1)$ second control signal or said average signal to be said third control signal representative of the period of the speech wave segment corresponding to said $(j-1)$ spectrum waveform.

4. Apparatus as defined in claim 3 wherein said selecting means comprises a source of second, third, and fourth logic control signals respectively indicative of the presence or absence of a largest peak exceeeding said adjustable threshold in the $j$, $(j-1)$, and $(j-2)$ spectrum waveforms, and logic means responsive to said first, second, third, and fourth logic control signals for selecting said $(j-1)$ second control signal to represent the period of the speech wave segment corresponding to the $(j-1)$ spectrum waveform for each $(j-1)$ spectrum waveform having a peak which exceeds said adjustable threshold level and which occurs at a time that does not deviate by more than a predetermined amount from the times of occurrence of the largest peaks exceeding said threshold level which are present in the $(j-2)$ and $j$ spectrum waveforms, and for selecting said average signal to represent the period of the speech wave segment corresponding to the $(j-1)$ spectrum waveform for each $(j-1)$ spectrum waveform in which either the $(j-1)$ spectrum waveform does not have a largest peak exceeding said threshold level and the $(j-2)$ and $j$ spectrum waveforms do have such peaks, or the $(j-2)$, $(j-1)$, and $j$ spectrum waveforms all have the largest peaks exceeding said adjustable threshold level but said $(j-1)$ spectrum waveform has a largest peak with a time of occurrence that deviates by said predetermined amount from the times of occurrence of the largest peaks in the $(j-2)$ and $j$ spectrum waveforms.

5. Apparatus for detecting the presence of voiced and unvoiced intervals in a speech wave from a succession of spectrum waveforms representative of the Fourier transform of the logarithm of the spectrum of corresponding successive segments of said speech wave which comprises means for deriving a control pulse for each of said spectrum waveforms having a largest peak with a magnitude that exceeds a predetermined threshold level, a source of first and second indicator signals, and means responsive to the presence and absence of control pulses derived from the $j$, $(j-1)$, and $(j-2)$ spectrum waveforms for selecting said first indicator signal to represent that the speech wave segment corresponding to the $(j-1)$ spectrum waveform is voiced and for selecting said second indicator signal to represent that that speech wave segment corresponding to the $(j-1)$ spectrum waveform is unvoiced, where $j$ is a selected positive integer, wherein said first indicator signal is selected in response to any one of the following three combinations of present and absent control pulses: (1) the presence of a control pulse derived for each of the $j$ and $(j-1)$ spectrum waveforms; (2) the presence of a control pulse derived for each of the $(j-1)$ and $(j-2)$ spectrum waveforms; and (3) the presence of a control pulse derived for each of the $j$ and $(j-2)$ spectrum waveforms together with the absence of a control pulse derived for the $(j-1)$ spectrum waveforms; and wherein said second indicator signal is selected in response to the presence and absence of control pulses derived from the $j$, $(j-1)$, and $(j-2)$ spectrum waveforms in combinations not included within said three combinations specified for selection of said first indicator signal.

6. Apparatus for detecting the presence of voiced and unvoiced intervals in a speech wave which comprises a source of a succession of spectrum waveforms representative of the Fourier transform of the logarithm of the spectrum of corresponding successive segments of said speech wave, means for analyzing said spectrum waveforms to determine the presence or absence in each of said spectrum waveforms of a single large peak which exceeds a predetermined threshold, and indicator means in circuit relation with said analyzing means for providing a voiced indicator signal indicative of the presence of a voiced segment of said speech wave corresponding to the $(j-1)$ spectrum waveform for each $(j-1)$ spectrum waveform in which there is present a single large peak that exceeds said predetermined threshold and which is either preceded or followed by a respective $(j-2)$ or $j$ spectrum waveform in which there is present a single large peak that exceeds said predetermined threshold, and for providing said voiced indicator signal for each $(j-1)$ spectrum waveform in which there is absent a single large peak that exceeds said predetermined threshold but which is both preceded and followed by respective $(j-2)$ and $j$ spectrum waveforms in each of which there is present a single large peak that exceeds said predetermined threshold.

7. Apparatus for determining the fundamental period of voiced intervals in a speech wave from a succession of spectrum waveforms represenative of the Fourier transform of the logarithm of the spectrum of corresponding successive segments of said speech wave which comprises means for analyzing each of said spectrum waveforms to determine the magnitude and time of occurrence of the largest peak in each of said spectrum waveforms, means in circuit relation with said analyzing means for generating an indicator signal represenative of whether or not each corresponding spectrum waveform contains a largest peak that exceeds a predetermined threshold, and means for deriving the period of the speech wave segment corresponding to the $(j-1)$ spectrum waveform from the indicator signals generated from the j, $(j-1)$, and $(j-2)$ spectrum waveforms and the times of occurrence of the largest peaks in the $j$, $(j-1)$, and $(j-2)$ spectrum waveforms, where $j$ is a selected positive integer, wherein said period is selected to be a predetermined average of the times of occurrence of the largest peaks in the $j$ and $(j-2)$ spectrum waveforms, provided said largest peaks in said $j$ and $(j-2)$ spectrum waveforms exceed said threshold, in each of the following two situations: (1) for each $(j-1)$ spectrum waveform in which there is no largest peak exceeding said threshold; and (2) for each $(j-1)$ spectrum waveform in which there is a largest peak exceeding said threshold but which has a time of occurrence that deviates by more than pre-set amount from the times of occurrence of said largest peaks exceeding said threshold in said $j$ and $(j-2)$ spectrum waveforms; and wherein said period is selected to be the time of occurrence of the largest peak in the $(j-1)$ spectrum waveform for each $(j-1)$ spectrum waveform in which the largest peak exceeds said threshold and does not deviate by more than said pre-set amount from the times of occurrence of said largest peaks exceeding said threshold in said $j$ and $(j-2)$ spectrum waveforms.

References Cited

UNITED STATES PATENTS

| | | |
|---|---|---|
| 3,030,450 | 5/1962 | Schroeder. |
| 3,109,142 | 10/1963 | McDonald. |
| 3,162,808 | 12/1964 | Haase. |

KATHLEEN H. CLAFFY, *Primary Examiner.*

R. P. TAYLOR, *Assistant Examiner.*